United States Patent
Wetterwald et al.

(10) Patent No.: US 10,681,128 B2
(45) Date of Patent: Jun. 9, 2020

(54) DETERMINISTIC STREAM SYNCHRONIZATION

(71) Applicant: Cisco Technology, Inc., San Jose, CA (US)

(72) Inventors: Patrick Wetterwald, Mouans Sartoux (FR); Eric Levy-Abegnoli, Valbonne (FR); Pascal Thubert, La Colle sur Loup (FR)

(73) Assignee: Cisco Technology, Inc., San Jose, CA (US)

( * ) Notice: Subject to any disclaimer, the term of this patent is extended or adjusted under 35 U.S.C. 154(b) by 427 days.

(21) Appl. No.: 15/291,211

(22) Filed: Oct. 12, 2016

(65) Prior Publication Data
US 2018/0103094 A1    Apr. 12, 2018

(51) Int. Cl.
| G06F 15/16 | (2006.01) |
| H04L 29/08 | (2006.01) |
| H04L 29/06 | (2006.01) |
| H04W 4/70 | (2018.01) |
| H04L 12/801 | (2013.01) |

(52) U.S. Cl.
CPC .......... *H04L 67/1095* (2013.01); *H04L 67/42* (2013.01); *H04W 4/70* (2018.02); *H04L 47/15* (2013.01); *H04L 47/17* (2013.01); *H04L 69/324* (2013.01)

(58) Field of Classification Search
CPC ............................. H04L 43/067; H04W 4/70
USPC .......................................................... 709/219
See application file for complete search history.

(56) References Cited

U.S. PATENT DOCUMENTS

| 2005/0058149 A1* | 3/2005 | Howe ..................... H04L 47/10 370/428 |
| 2011/0219137 A1* | 9/2011 | Yang ................. H04L 29/12103 709/231 |
| 2015/0023186 A1* | 1/2015 | Vasseur ................. H04L 43/103 370/252 |
| 2016/0105704 A1* | 4/2016 | Gardner ............. H04N 21/2662 725/109 |
| 2016/0109930 A1* | 4/2016 | Hiraoka ................ G06F 1/3215 713/320 |

(Continued)

OTHER PUBLICATIONS

F. Dewanta, F. P. Rezha and D. Kim, "Message scheduling approach on dedicated time slot of ISA100.11a," 2012 International Conference on ICT Convergence (ICTC), Jeju Island, 2012, pp. 466-471. (Year: 2012).*

(Continued)

*Primary Examiner* — Melvin H Pollack
*Assistant Examiner* — Messeret F Gebre
(74) *Attorney, Agent, or Firm* — Behmke Innovation Group LLC; James M. Behmke; James J. Wong (57) ABSTRACT

In one embodiment, a device in a network identifies a node in the network that is not synchronized to a network time synchronization mechanism. The device determines a scheduled reception time for a particular deterministic traffic flow at which the device is to receive the traffic flow from the node. The device sends, prior to the scheduled reception time, a request to the node for the particular deterministic traffic flow. The request identifies the particular deterministic traffic flow and causes the node to send the traffic flow to the device. The device receives the particular deterministic traffic flow from the node at the scheduled reception time.

18 Claims, 8 Drawing Sheets

(56) References Cited

U.S. PATENT DOCUMENTS

2017/0207963 A1* 7/2017 Mehta ................. H04L 41/0896
2017/0237671 A1* 8/2017 Rimmer ................. H04L 69/22
370/235

OTHER PUBLICATIONS

Dong, L., Melhem, R., & Mosse, D. (1998). Time slot allocation for real-time messages with negotiable distance constraints (Year: 1998).*
S. Goldfisher and S. Tanabe, "IEEE 1901 access system: An overview of its uniqueness and motivation," in IEEE Communications Magazine, vol. 48, No. 10, pp. 150-157, Oct. 2010. (Year: 2010).*
The 5 Critters; pp. 1-6.
"802.1Qav—Forwarding and Queuing Enhancements for Time-Sensitive Streams" IEEE 802.1; http://www.ieee802.org/1/pages /802.1av.html; pp. 1-7.
"802.1Qbv—Enhancements for Scheduled Traffic" IEEE 802.1; http://www.ieee802.org/1/pages/802.1av.html; pp. 1-4.
"Cross-Layer Architecture" Figure 3 MAC PDU and generic MAC header; p. 1.
Myungcheol Doo "Spatial and Social Diffusion of Information and Influence: Models and Algorithms" Georgia Institute of Technology; Aug. 2012; pp. 1-25.
"The 5 Critters" IEEE 802.1 Qbv DRAFT 5C's for Time Aware Shaper enhancement to 802.1Q, Version 2; Jan. 2012; pp. 1-7.
Lynch et al. "Motion Coordination using Virtual Nodes" CSAIL, MIT; pp. 1-12.
P 802.1 Qbu; Amendment to IEEE Standard 802.1Q-2011; pp. 1-2.

* cited by examiner

DETERMINISTIC STREAM SYNCHRONIZATION

TECHNICAL FIELD

The present disclosure relates generally to computer networks, and, more particularly, to deterministic stream synchronization in a network.

BACKGROUND

In general, deterministic networking attempts to precisely control when a data packet arrives at its destination (e.g., within a bounded timeframe). This category of networking may be used for a myriad of applications such as industrial automation, vehicle control systems, and other systems that require the precise delivery of control commands to a controlled device. However, implementing deterministic networking also places additional requirements on a network. For example, packet delivery in a deterministic network may require the network to exhibit fixed latency, zero or near-zero jitter, and high packet delivery ratios.

As an example of a deterministic network, consider a railway system. A railway system can be seen as deterministic because trains are scheduled to leave a railway station at certain times, to traverse any number stations along a track at very precise times, and to arrive at a destination station at an expected time. From the human perspective, this is also done with virtually no jitter. Which tracks are used by the different trains may also be selected so as to prevent collisions and to avoid one train from blocking the path of another train and delaying the blocked train.

Low power and lossy networks (LLNs), e.g., Internet of Things (IoT) networks, have a myriad of applications, such as sensor networks, Smart Grids, and Smart Cities. Various challenges are presented with LLNs, such as lossy links, low bandwidth, low quality transceivers, battery operation, low memory and/or processing capability, etc. Changing environmental conditions may also affect device communications in an LLN. For example, physical obstructions (e.g., changes in the foliage density of nearby trees, the opening and closing of doors, etc.), changes in interference (e.g., from other wireless networks or devices), propagation characteristics of the media (e.g., temperature or humidity changes, etc.), and the like, also present unique challenges to LLNs.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

According to one or more embodiments of the disclosure, a device in a network identifies a node in the network that is not synchronized to a network time synchronization mechanism. The device determines a scheduled reception time for a particular deterministic traffic flow at which the device is to receive the traffic flow from the node. The device sends, prior to the scheduled reception time, a request to the node for the particular deterministic traffic flow. The request identifies the particular deterministic traffic flow and causes the node to send the traffic flow to the device. The device receives the particular deterministic traffic flow from the node at the scheduled reception time.

In further embodiments, a node in a network identifies a particular traffic flow as deterministic. The node buffers the particular deterministic traffic flow for communication. The node receives a request to send the buffered traffic flow to a device in the network. The request identifies the particular deterministic traffic flow and was sent prior to a scheduled reception time at which the device is to receive the traffic flow. The node sends the buffered traffic flow to the device, in response to receiving the request.

DESCRIPTION

A computer network is a geographically distributed collection of nodes interconnected by communication links and segments for transporting data between end nodes, such as personal computers and workstations, or other devices, such as sensors, etc. Many types of networks are available, ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), synchronous digital hierarchy (SDH) links, or Powerline Communications (PLC) such as IEEE 61334, IEEE P1901.2, and others. In addition, a Mobile Ad-Hoc Network (MANET) is a kind of wireless ad-hoc network, which is generally considered a self-configuring network of mobile routers (and associated hosts) connected by wireless links, the union of which forms an arbitrary topology.

Smart object networks, such as sensor networks, in particular, are a specific type of network having spatially distributed autonomous devices such as sensors, actuators, etc., that cooperatively monitor physical or environmental conditions at different locations, such as, e.g., energy/power consumption, resource consumption (e.g., water/gas/etc. for advanced metering infrastructure or "AMI" applications) temperature, pressure, vibration, sound, radiation, motion, pollutants, etc. Other types of smart objects include actuators, e.g., responsible for turning on/off an engine or perform any other actions. Sensor networks, a type of smart object network, are typically shared-media networks, such as wireless or PLC networks. That is, in addition to one or more sensors, each sensor device (node) in a sensor network may generally be equipped with a radio transceiver or other communication port such as PLC, a microcontroller, and an energy source, such as a battery. Often, smart object networks are considered field area networks (FANs), neighborhood area networks (NANs), etc. Generally, size and cost constraints on smart object nodes (e.g., sensors) result in corresponding constraints on resources such as energy, memory, computational speed and bandwidth.

Figure 1:
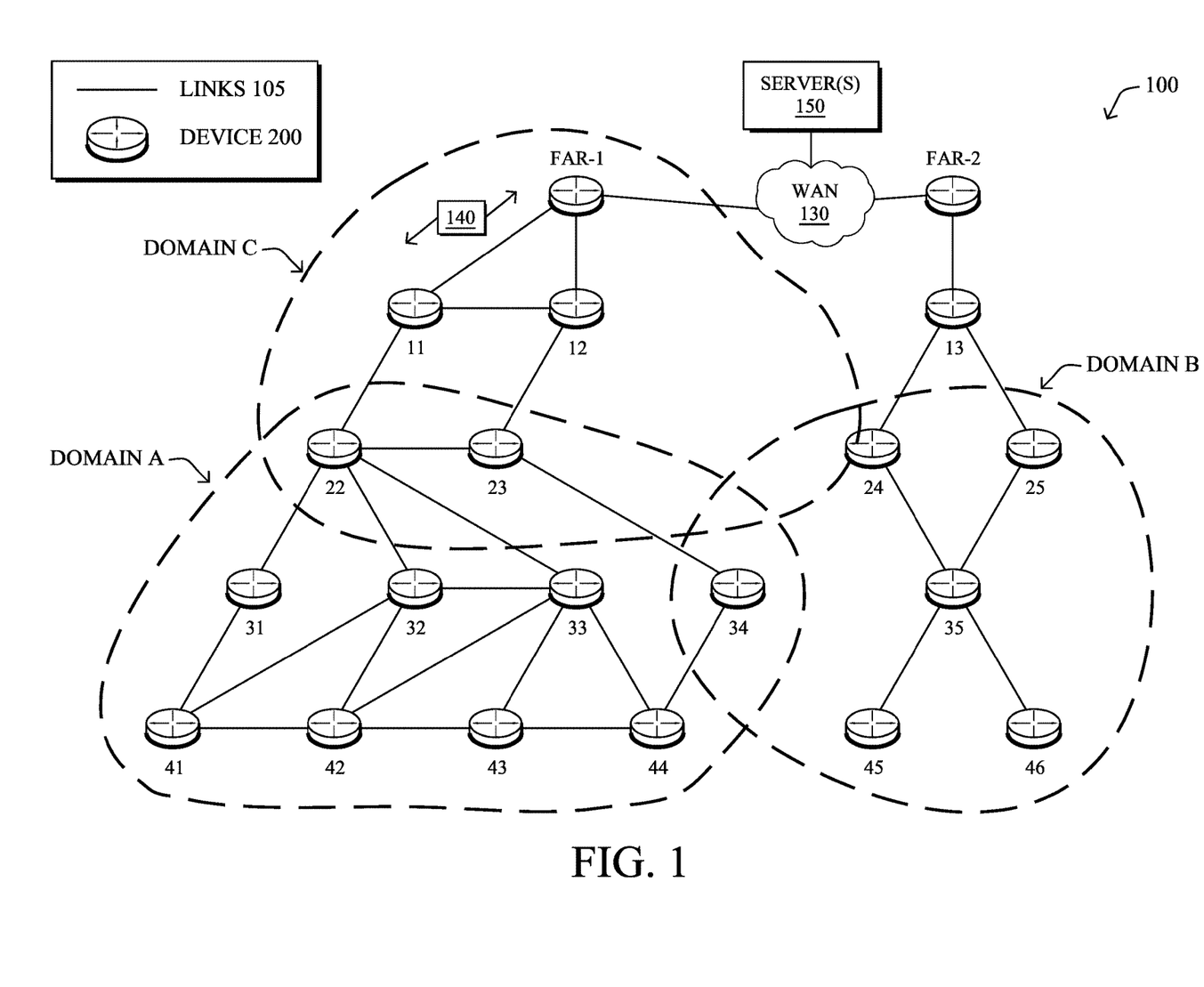
FIG. 1 illustrates an example communication network.

FIG. 1 is a schematic block diagram of an example computer network 100 illustratively comprising nodes/devices 200 (e.g., labeled as shown, "FAR-1," "FAR-2," and "11," "12," . . . "46," and described in FIG. 2 below) interconnected by various methods of communication. For instance, the links 105 may be wired links or shared media (e.g., wireless links, PLC links, etc.) where certain nodes 200, such as, e.g., routers, sensors, computers, etc., may be in communication with other nodes 200, e.g., based on distance, signal strength, current operational status, location, etc. Those skilled in the art will understand that any number of nodes, devices, links, etc. may be used in the computer network, and that the view shown herein is for simplicity. Also, those skilled in the art will further understand that while network 100 is shown in a certain orientation, particularly with a field area router (FAR) node, the network 100 is merely an example illustration that is not meant to limit the disclosure. Also as shown, a particular FAR (e.g., FAR-1) may communicate via a WAN 130 with any number of servers 150, such as a path computation element (PCE), network management service (NMS), or other supervisory device.

Data packets 140 (e.g., traffic and/or messages sent between the devices/nodes) may be exchanged among the nodes/devices of the computer network 100 using predefined network communication protocols such as certain known wired protocols, wireless protocols (e.g., IEEE Std. 802.15.4, WiFi, Bluetooth®, etc.), PLC protocols, or other shared-media protocols where appropriate. In this context, a protocol consists of a set of rules defining how the nodes interact with each other. One communication technique that may be used to implement links 105 is channel-hopping. Also known as frequency hopping, use of such a technique generally entails wireless devices "hopping" (e.g., alternating) between different transmission and reception frequencies according to a known schedule. Network 100 may also be divided into any number of wireless domains (e.g., domains A-C) in which nodes 200 may communicate.

In some embodiments, network 100 may be configured as a deterministic network. Generally, deterministic networking refers to networks that can guaranty the delivery of packets within a bounded time. For example, industrial networking typically requires predictable communications between devices (e.g., to actuate a machine along an assembly line at a precise time, etc.). This translates into the following criteria: 1.) a high delivery ratio (e.g., a loss rate of $10^{-5}$ to $10^{-9}$, depending on the application), 2.) fixed latency, and 3.) jitter close to zero (e.g., on the order of microseconds).

A limited degree of control over the timing of network traffic can be achieved by using quality of service (QoS) tagging and/or performing traffic shaping/admission control. For time sensitive flows, though, latency and jitter can only be fully controlled by scheduling every transmission at every hop. In turn, the delivery ratio can be optimized by applying packet redundancy with all possible forms of diversity in terms of space, time, frequency, code (e.g., in CDMA), hardware (e.g., links, routers, etc.), software (implementations), etc. Most of the methods above apply to both Ethernet and wireless technologies. Mixed approaches may combine QoS technologies with scheduling (e.g., triggering emission of packets on the different QoS queues using a schedule-based gate mechanism).

Figure 2:
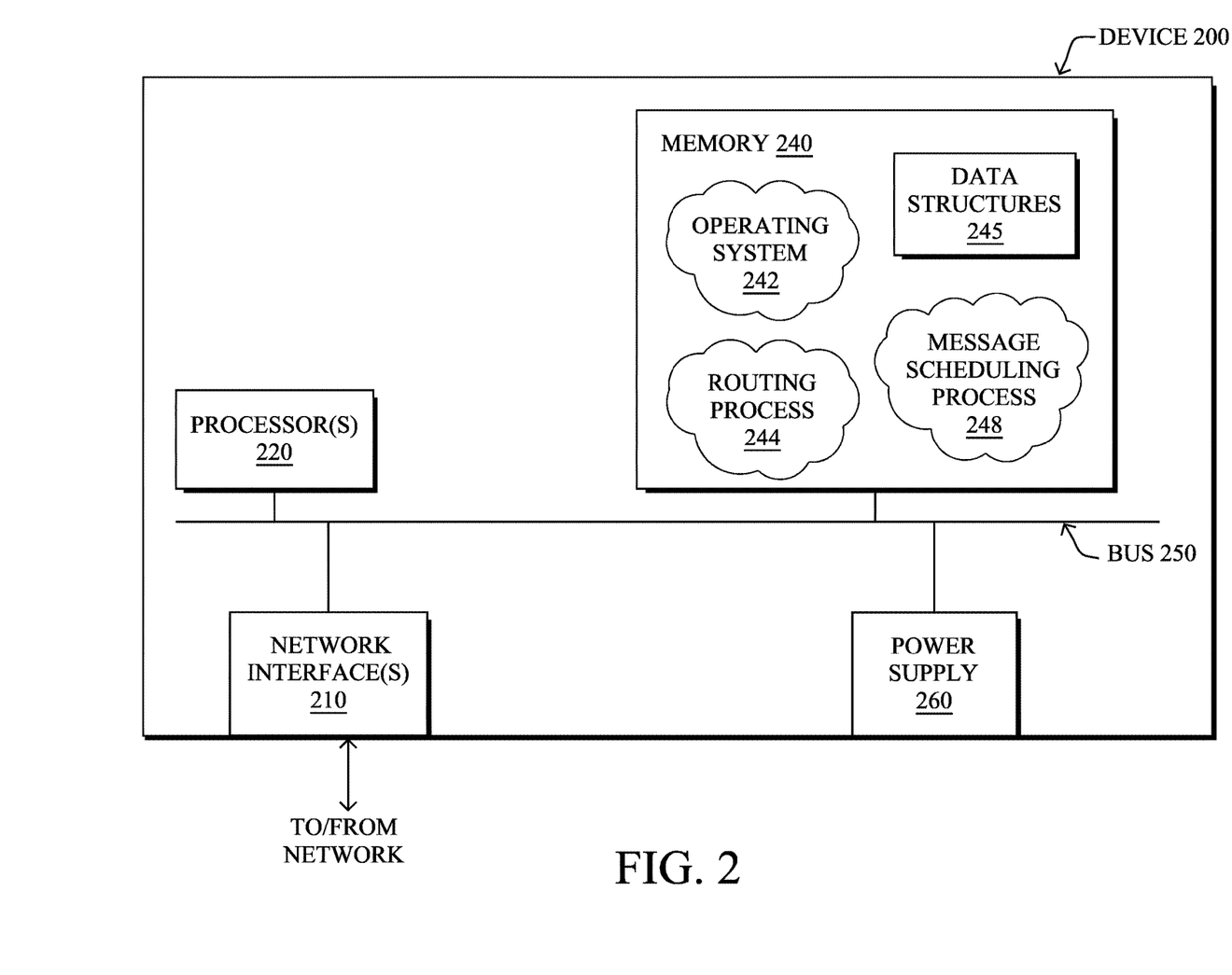
FIG. 2 illustrates an example network device/node.

FIG. 2 is a schematic block diagram of an example node/device 200 that may be used with one or more embodiments described herein, e.g., as any of the nodes shown in FIG. 1 above. The device may comprise one or more network interfaces 210 (e.g., wired, wireless, PLC, etc.), at least one processor 220, and a memory 240 interconnected by a system bus 250, as well as a power supply 260 (e.g., battery, plug-in, etc.).

The network interface(s) 210, e.g., transceivers, include the mechanical, electrical, and signaling circuitry for communicating data over links 105 coupled to the network 100. The network interfaces may be configured to transmit and/or receive data using a variety of different communication protocols, particularly for frequency-hopping communication as described herein. Note, further, that the nodes may have two different types of network connections 210, e.g., wireless and wired/physical connections, and that the view herein is merely for illustration. Also, while the network interface 210 is shown separately from power supply 260, for PLC the network interface 210 may communicate through the power supply 260, or may be an integral component of the power supply. In some specific configurations the PLC signal may be coupled to the power line feeding into the power supply.

The memory 240 includes a plurality of storage locations that are addressable by the processor 220 and the network interfaces 210 for storing software programs and data structures associated with the embodiments described herein. Note that certain devices may have limited memory or no memory (e.g., no memory for storage other than for programs/processes operating on the device and associated caches). The processor 220 may include hardware elements or hardware logic configured to execute the software programs and manipulate the data structures 245. An operating system 242, portions of which are typically resident in memory 240 and executed by the processor, functionally organizes the device by, inter alia, invoking operations in support of software processes and/or services executing on the device. These software processes and/or services may include routing process/services 244, and an illustrative message scheduling process 248 as described in greater detail below. Note that while message scheduling process 248 is shown in centralized memory 240, alternative embodiments provide for the process to be specifically operated within the network interfaces 210, such as within a MAC layer.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while the processes have been shown separately, those skilled in the art will appreciate that processes may be routines or modules within other processes.

Routing process (services) 244 includes instructions executable by processor 220 to perform functions provided by one or more routing protocols, such as proactive or reactive routing protocols as will be understood by those skilled in the art. These functions may, on capable devices, be configured to manage a routing/forwarding table (a data structure 245) including, e.g., data used to make routing/forwarding decisions. In particular, in proactive routing, connectivity is discovered and known prior to computing routes to any destination in the network, e.g., link state routing such as Open Shortest Path First (OSPF), or Intermediate-System-to-Intermediate-System (ISIS), or Optimized Link State Routing (OLSR). Reactive routing, on the other hand, discovers neighbors (i.e., does not have an a priori knowledge of network topology), and in response to a needed route to a destination, sends a route request into the network to determine which neighboring node may be used to reach the desired destination. Example reactive routing protocols may comprise Ad-hoc On-demand Distance Vector (AODV), Dynamic Source Routing (DSR), 6LoWPAN Ad Hoc On-Demand Distance Vector Routing (LOAD), DYnamic MANET On-demand Routing (DYMO), etc. Notably, on devices not capable or configured to store routing entries, routing process 244 may consist solely of providing mechanisms necessary for source routing techniques. That is, for source routing, other devices in the network can tell the less capable devices exactly where to send the packets, and the less capable devices simply forward the packets as directed.

Low power and Lossy Networks (LLNs), e.g., certain sensor networks, may be used in a myriad of applications such as for "Smart Grid" and "Smart Cities." A number of challenges in LLNs have been presented, such as:

1) Links are generally lossy, such that a Packet Delivery Rate/Ratio (PDR) can dramatically vary due to various sources of interferences, e.g., considerably affecting the bit error rate (BER);

2) Links are generally low bandwidth, such that control plane traffic must generally be bounded and negligible compared to the low rate data traffic;

3) There are a number of use cases that require specifying a set of link and node metrics, some of them being dynamic, thus requiring specific smoothing functions to avoid routing instability, considerably draining bandwidth and energy;

4) Constraint-routing may be required by some applications, e.g., to establish routing paths that will avoid non-encrypted links, nodes running low on energy, etc.;

5) Scale of the networks may become very large, e.g., on the order of several thousands to millions of nodes; and 6) Nodes may be constrained with a low memory, a reduced processing capability, a low power supply (e.g., battery).

In other words, LLNs are a class of network in which both the routers and their interconnect are constrained: LLN routers typically operate with constraints, e.g., processing power, memory, and/or energy (battery), and their interconnects are characterized by, illustratively, high loss rates, low data rates, and/or instability. LLNs are comprised of anything from a few dozen and up to thousands or even millions of LLN routers, and support point-to-point traffic (between devices inside the LLN), point-to-multipoint traffic (from a central control point to a subset of devices inside the LLN) and multipoint-to-point traffic (from devices inside the LLN towards a central control point).

An example implementation of LLNs is an "Internet of Things" network. Loosely, the term "Internet of Things" or "IoT" may be used by those in the art to refer to uniquely identifiable objects (things) and their virtual representations in a network-based architecture. In particular, the next frontier in the evolution of the Internet is the ability to connect more than just computers and communications devices, but rather the ability to connect "objects" in general, such as lights, appliances, vehicles, HVAC (heating, ventilating, and air-conditioning), windows and window shades and blinds, doors, locks, etc. The "Internet of Things" thus generally refers to the interconnection of objects (e.g., smart objects), such as sensors and actuators, over a computer network (e.g., IP), which may be the Public Internet or a private network. Such devices have been used in the industry for decades, usually in the form of non-IP or proprietary protocols that are connected to IP networks by way of protocol translation gateways. With the emergence of a myriad of applications, such as the smart grid, smart cities, and building and industrial automation, and cars (e.g., that can interconnect millions of objects for sensing things like power quality, tire pressure, and temperature and that can actuate engines and lights), it has been of the utmost importance to extend the IP protocol suite for these networks.

Deterministic networking is a fundamental component of the IoT, and is needed for time critical applications such as industrial automation, inflight control systems, internal vehicle networking, and the like. Most of these application fields are mission critical and require novel solution since up to recently they are manual controlled an operated, the emergence of dynamic system requiring the specification of the number of new solutions to address fast emerging requirements. Accordingly, in some embodiments, routing process 244 may be configured to support deterministic technologies such as Deterministic Ethernet or Deterministic Wireless. Generally, these technologies use time scheduling, to ensure that all nodes of a given path are synchronized. The Network Time Protocol (NTP) and Precision Time Protocol (PTP) are example protocols that may be used to synchronize the local timing mechanisms of the nodes. Forwarding of each packet is then regulated by the synchronized time schedule, which specifies when a given packet has to be transmitted. Generally, this time period is referred to as a time slot. In some implementations, an external agent such as a PCE or the like, sometimes also referred to as an orchestrator, may be configured to compute the path and associated timetables for the path. The computed path and timetable are then downloaded onto every node along the path which, in turn, transmits packets along the path according to the computed time schedule.

Routing in a deterministic network can be operated either in a centralized or in a distributed fashion, but only the centralized routing operation can guarantee the overall optimization for all the flows with a given set of constraints and goals. The centralized computation is typically done by a PCE with an objective function that represents the goals and constraints. A PCE may compute not only an optimized Layer 3 path for purposes of traffic engineering, but also to compute time slots associated with a deterministic flow at the same time as it computes a route over an LLN. Generally speaking, this requires the PCE to have knowledge of the flows as well as knowledge of the radio behavior at each hop (e.g., an estimation of the expected transmission count (ETX) so as to provision enough time slots for retransmissions).

In deterministic networking, the assumption is that all elements in the network are fully synchronized. However, this may not be the case in all deployments. For example, some or all of the nodes/devices in the network may not have the necessary hardware or software to synchronize with a network clock such as via NTP, PTP, or another clock synchronization mechanism. This is particularly true in IoT networks, where the nodes/devices may have limited resources and functionality. In such cases, this may lead to the network being only partially optimized for deterministic communication.

Deterministic Stream Synchronization

The techniques herein implement a deterministic communication stream in a network, even when a device or stack in the network is not time synchronized. In some aspects, a deterministic polling mechanism may be employed (e.g., based on a traffic flow identifier) to enable deterministic behavior from nodes that are not capable of time synchronizations.

Specifically, according to one or more embodiments of the disclosure as described in detail below, a device in a network identifies a node in the network that is not synchronized to a network time synchronization mechanism. The device determines a scheduled reception time for a particular deterministic traffic flow at which the device is to receive the traffic flow from the node. The device sends, prior to the scheduled reception time, a request to the node for the particular deterministic traffic flow. The request identifies the particular deterministic traffic flow and causes the node to send the traffic flow to the device. The device receives the particular deterministic traffic flow from the node at the scheduled reception time.

Illustratively, the techniques described herein may be performed by hardware, software, and/or firmware, such as in accordance with the message scheduling process 248, which may contain computer executable instructions executed by the processor 220 (or independent processor of interfaces 210) to perform functions relating to the techniques described herein, e.g., in conjunction with routing process 244. For example, the techniques herein may be treated as extensions to conventional protocols, such as the various wireless communication protocols, and as such, may be processed by similar components understood in the art that execute those protocols, accordingly.

Figure 3A:
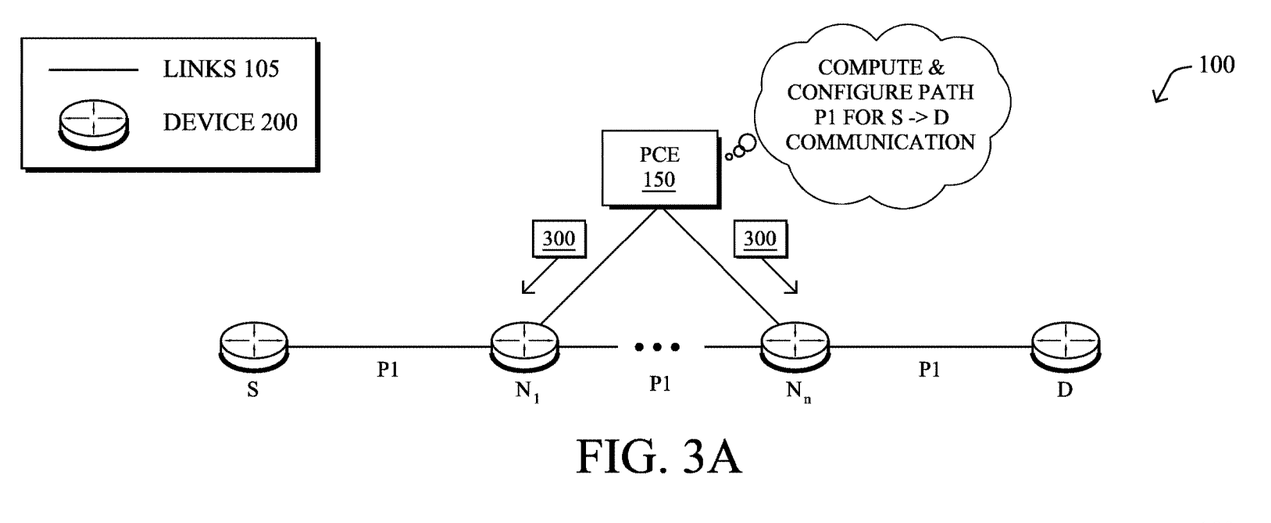
FIGS. 3A-3B illustrates an example of the configuration of a deterministic path in a network.
Figure 3B:
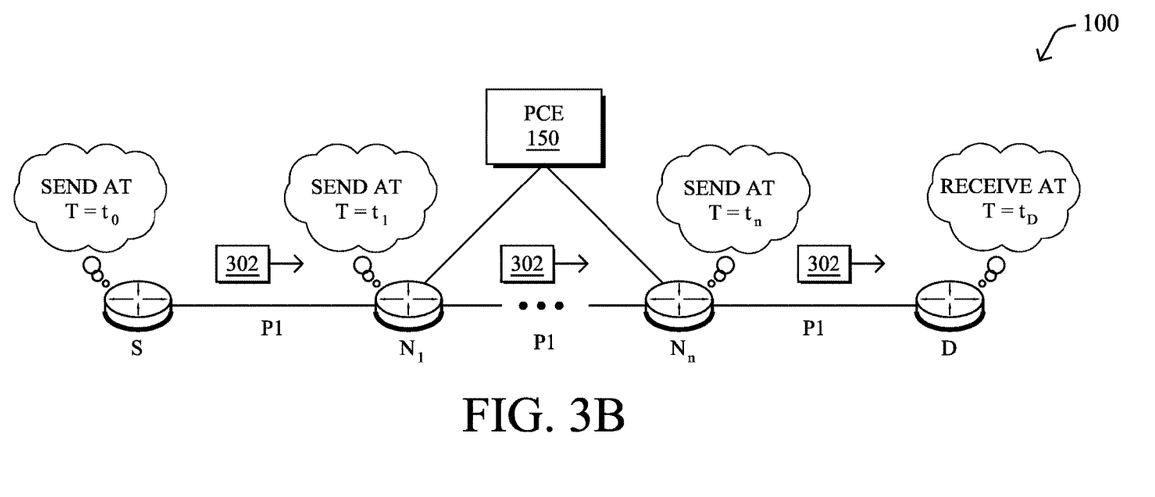

Operationally, FIGS. 3A-3B illustrates an example of the configuration of a deterministic path in a network, according to various embodiments. As shown, assume that network 100 includes a PCE 150, a source node S that is to send a particular traffic flow to a destination node D, and n-number of intermediate nodes/devices 200 $N_1$ to $N_n$ that connect node S to node D along a network path P1. As would be appreciated, PCE 150 may be a specialized device 200 that receives topology and other link information from the other nodes/devices in 100 and, based on the received information, computes communication paths in the network for various traffic flows.

In some implementations, any or all of the nodes/devices shown may be synchronized to a network time synchronization process. For example, the nodes/devices shown may exchange NTP or PTP messages, to ensure that their internal clocks are synchronized. This clock synchronization allows each node/device to use a universal communication schedule, thereby ensuring delivery of a communication deterministically.

As shown in FIG. 3A, each node/device in network 100 may support synchronized scheduling and, thus, network 100 may be fully deterministic in some implementations. In such cases, each packet may be emitted by the source node S or a relay node (e.g., any of nodes $N_1$ to $N_n$) according to a schedule. For example, PCE 150 may use its topology information, etc., regarding network 100 to compute and configure path P1, including a communication schedule for each node/device along the path. In turn, PCE 150 may push the computed configuration and schedule to the nodes/devices via messages 300.

In turn, as shown in FIG. 3B, each node/device along path P1 may transmit communications 302 belonging to a particular traffic flow according to their configured transmission schedules. For example, at time $T=t_0$, source node S may transmit communication 302 to node $N_1$. At time $T=t_1$, node $N_1$ may then send communication 302 on to the next hop along path P1, in accordance with the schedule computed by PCE 150. This process may continue until node $N_n$ sends communication 302 on to destination node at time $T=t_n$, thereby ensuring delivery of communication 302 at destination node D at time $T=t_D$.

The nodes/devices in network 100 may use various mechanisms to ensure that the deterministic constraints are met. In some cases, the synchronization between source node S and the first node $N_1$ in path P1 could be achieved by a shaper in $N_1$, which may be an access switch. In another cases, node $N_1$ could also mark the packets of communication 302, to identify the flow for the further nodes along path P1. This necessitates that the required bandwidth for the flow has been clearly defined and the buffers of the nodes along path P1 have been configured to support the required bandwidth. In a further case, such as that shown in FIG. 3B, synchronization can also be achieved by having source node S be synchronized and send communication 302 at the exact time (e.g., time $T=t_0$) that it is expected to, according to the overall communication schedule. In this case, node S is required to have the hardware and/or software needed to support the time synchronization mechanism, which can be very expensive in the case of simple devices, such as many IoT devices.

As shown in FIGS. 4A-4D, cases may arise in which the source node S is not synchronized with the first hop node $N_1$ along path P1. Notably, if source node S does not support a network time synchronization mechanism to ensure that its internal clock is synchronized to that of node $N_1$, network 100 will not support fully scheduled deterministic communications using the above techniques (e.g., by sharing the communication schedule with node S).

In various embodiments, assume that PCE 150 obtains information that source node S does not support a network time synchronization mechanism. For example, if source node S does not send the appropriate messages in response to a synchronization request sent via NTP, PTP, etc., the device that sent the request may notify PCE 150 that node S does not support the time synchronization mechanism and is not, therefore, synchronized with node $N_1$. In further cases, PCE 150 may receive information regarding the device type of source node S which may indicate whether or not the node supports a time synchronization mechanism. In yet another case, an administrator may flag source node S as not supporting a time synchronization mechanism.

Figure 4A:
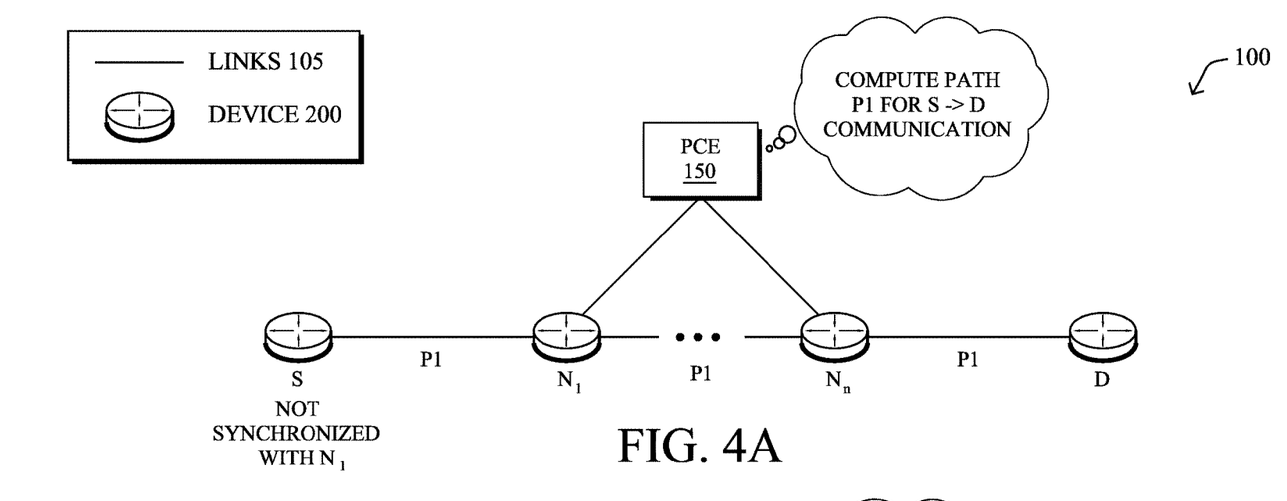
FIGS. 4A-4D illustrate examples of a traffic flow being sent deterministically from an unsynchronized source node.
Figure 4B:
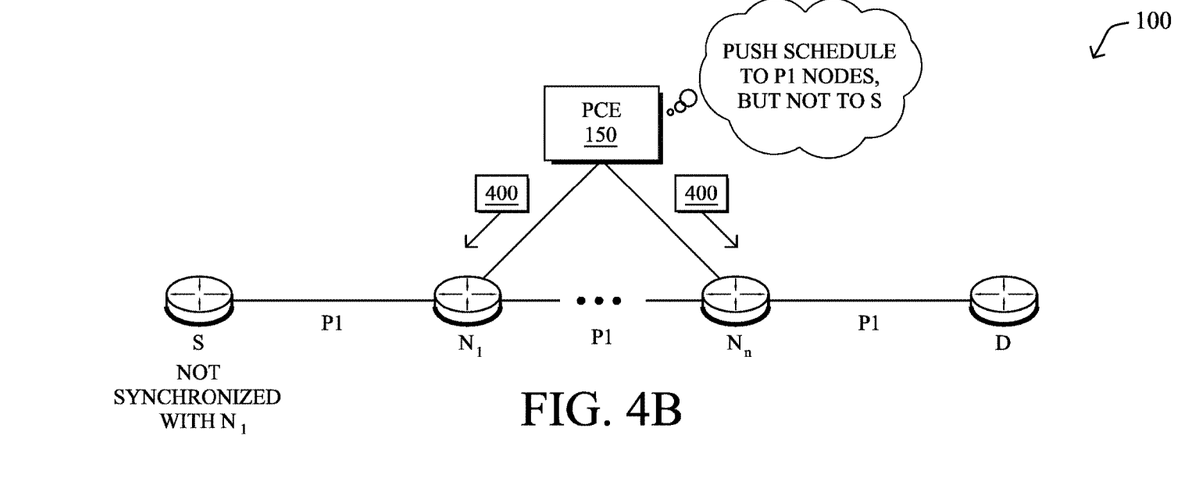

Similar to the example shown in FIG. 3A, PCE 150 may compute path P1 for the particular traffic flow to be sent from source node S to destination node D, but also take into account that node S is not synchronized with $N_1$, as shown in FIG. 4A. In turn, as shown in FIG. 4B, PCE 150 may push the path configuration and communication schedule information to the nodes along path P1 (e.g., nodes $N_1$ to $N_n$) via messages 400, but not to source node S. In other words, since source node S in FIG. 4B cannot support the deterministic communication schedule as it cannot synchronize with node $N_1$, it will not receive the schedule from PCE 150.

Figure 4C:
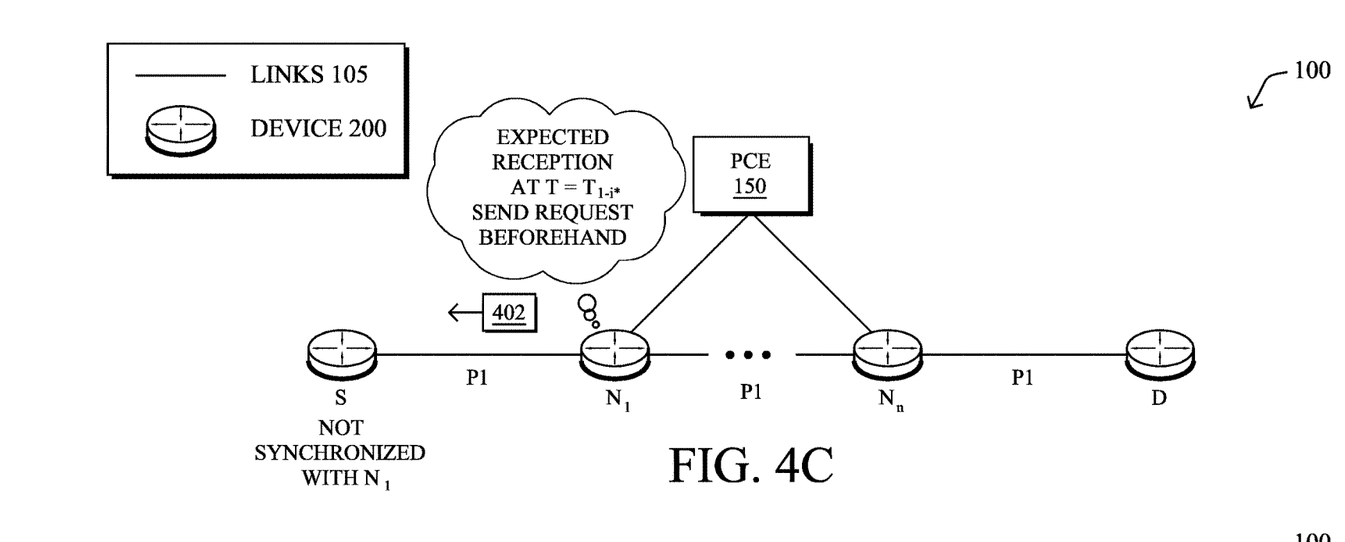

In FIG. 4C, based on the path configuration and communication schedule sent to node $N_1$, node $N_1$ know the following:

1.) That source node S is not time-synchronized to node $N_1$.

2.) The specific traffic flow that node $N_1$ is to receive from source node S and is destined for node D.

3.) The precise time at which node $N_1$ expects to receive the traffic communication from source node S, in accordance with the deterministic communication schedule computed by PCE 150 for the particular traffic flow from node S to node D. By way of example, assume that node $N_1$ expects to receive the flow communication from node S at time $T=t_{1-i}$ so that node $N_1$ can itself send the communication on to the next hop along path P1 at time $T=t_1$.

According to various embodiments, just prior to the expected reception time $T=t_{1-i}$, node $N_1$ may send an MND-request 402 to source node S, to request that source node S begin sending the traffic flow towards destination node D. In some embodiments, request 402 may include a flow identifier that identifies the particular traffic flow/communication that is being requested. For example, request 402 may include the n-tupple comprising the address of destination node D, any Differentiated Services Code Point (DSCP) tags used for the flow, or any other form of identification. Notably, request 402 is based on the precomputed schedule from PCE 150 and may, in some cases, be a link layer message.

To take into account the overall latency, time $T=t_{1-i}$ at which request 402 is sent may be based on any or all of the following: 1.) the transmission time to convey request 402 to source node S, 2.) processing time for source node S to handle request 402, locate the corresponding buffer in which the requested communication is stored, and schedule the frame in the buffer, and 3.) the transmission time to convey the requested communication from source node S to node $N_1$.

With respect to jitter, in a direct Ethernet connection between node $N_1$ and source node S, the only source of jitter is a packet that is already in transmission. However, network 100 may employ mechanisms such as the IEEE 8021.Qbu protocol, which may allow for preemption of other frames in favor of the requested deterministic frame. Such mechanisms may allow source node S to put the other frames on hold while the requested frame of the traffic flow is sent. Conversely, node $N_1$ can also use this mechanism in the opposite direction when sending request 402 to node S.

With respect to the processing time by source node S, the handling may be similar to handling a time out in a time triggered Ethernet, with the expectation in both cases that the frame is already in the station and placed in a buffer that is associated to the expected event (e.g., receipt of request 402). Notably, in various embodiments, source node S may maintain a buffer that is not triggered by a timer, in contrast to TTTech, 8021.Qcc, etc. networks, but is instead triggered by receipt of request 402.

If source node S is not capable of the above, node $N_1$ may absorb some jitter by sending request 402 a little in advance and avoiding having node S send any volume of data at any time. Using the techniques herein, node $N_1$ may use a User-Network Interface (UNI) to periodically ask source node S for a certain amount of bytes (e.g., a maximum amount of bytes) for a particular flow via request 402. Doing so guarantees that the buffers in node $N_1$ will not be overwhelmed and that there will be no more data than expected that enters the network.

Figure 4D:
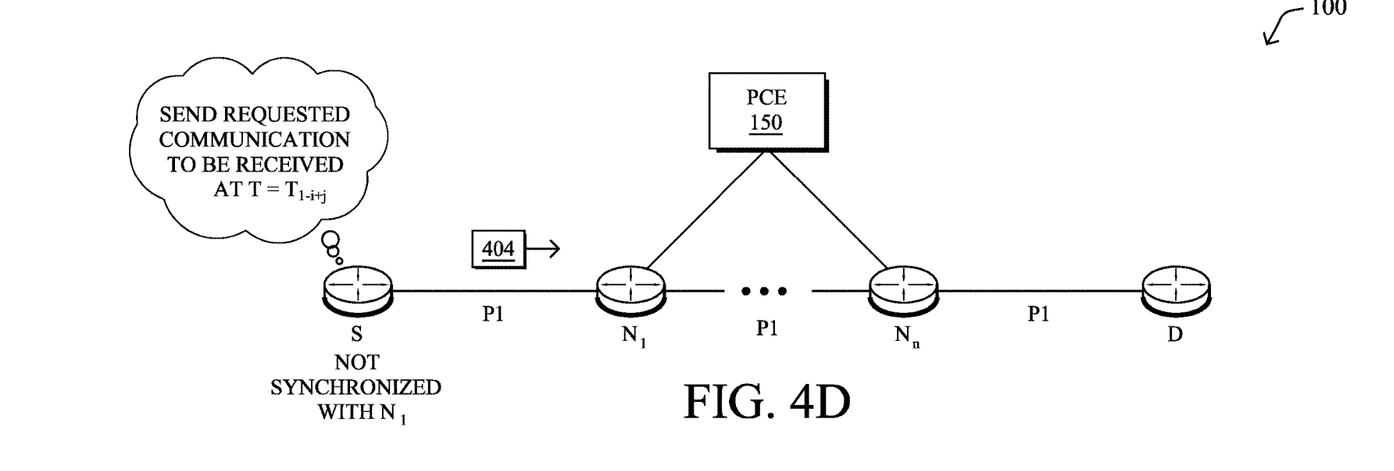

As shown in FIG. 4D, in response to receiving request 402, source node S may identify the packets that it has in its emission queue(s) that match the traffic flow identifier from request 402. Such matching could be performed in hardware, in some cases. In turn, source node S may send the matching packet as communication 404 to node $N_1$ via the link between source node S and node $N_1$. Notably, if request 402 is sent at a time that takes into account the various factors that can affect the reception of communication 404 by node $N_1$, network 100 can still guarantee delivery of communication 404 to node $N_1$ at the expected delivery time, $T=t_{1-i+j}$. Doing so allows for node $N_1$ in turn to send communication 404 on to its next hop along path P1, according to the deterministic communication schedule from PCE 150.

As would be appreciated, the above techniques allow for deterministic communications in a network in which some nodes are unsynchronized and on a per-flow basis (e.g., based on the flow identifier in request 402). Thus, in some embodiments, different deterministic flows can also be processed from the same source node S with different periods and potentially to different destinations, as well.

Figure 5:
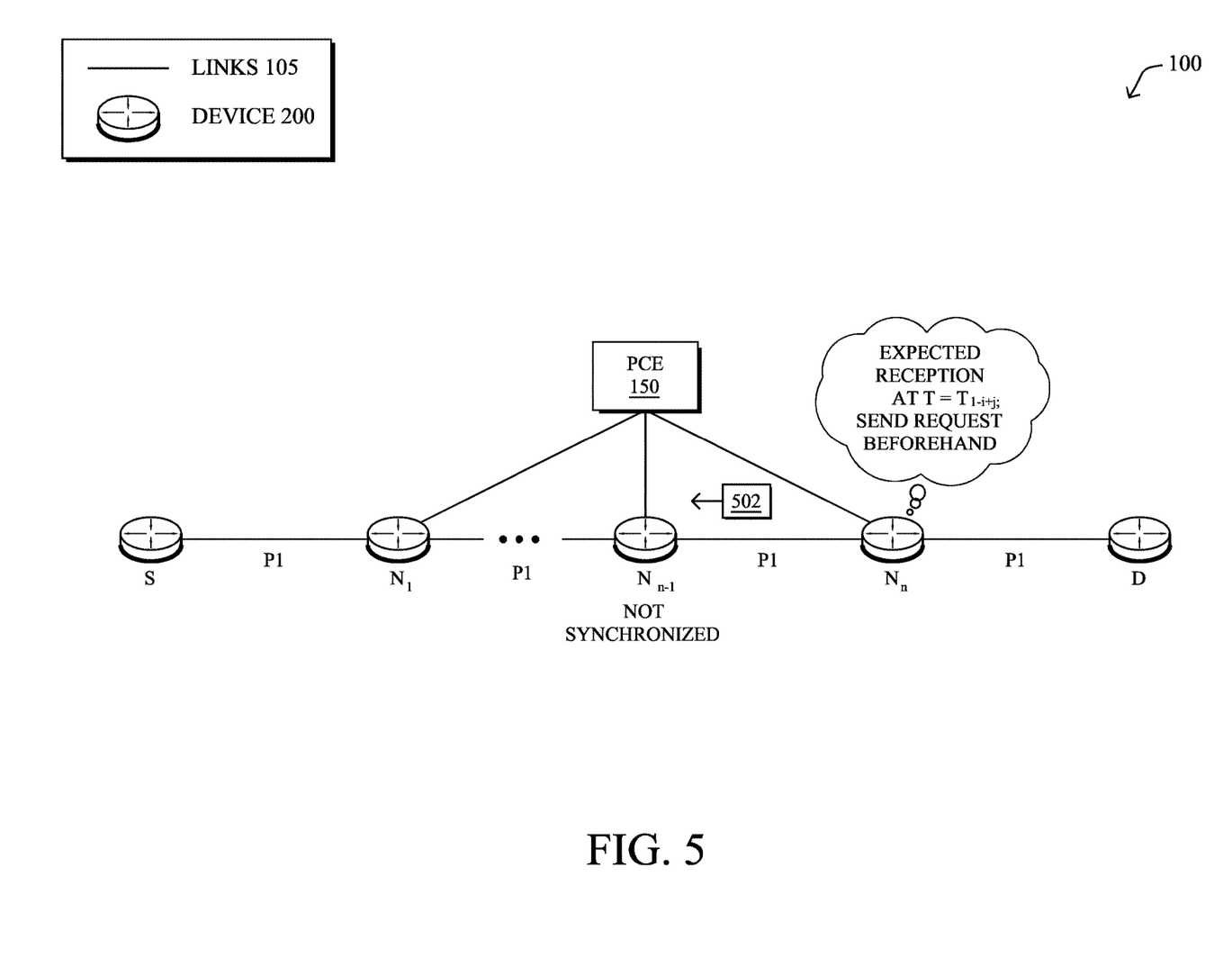
FIG. 5 illustrates an example of a traffic flow being sent deterministically via a network path that includes an unsynchronized relay node.

Referring now to FIG. 5, the techniques herein can also be applied to other nodes along a communication path, besides the source node of a flow. For example, as shown, assume that path P1 includes a relay node $N_{n-1}$ that is not synchronized and cannot support the deterministic communication schedule from PCE 150. In such a case, a similar mechanism to that described above can be implemented between node $N_{n-1}$ and its next hop along path P1, node $N_n$. Notably, prior to the expected reception time for the given traffic flow, node $N_n$ may send a request 502 to node $N_{n-1}$ that causes node $N_{n-1}$ to send the requested communication to node $N_n$ for reception at the expected reception time, $T=t_{n-i+j}$. Doing so allows node $N_n$ to receive the requested flow in time to send it on to the next hop along path P1, destination node D, at time $T=T_n$ and in accordance with the deterministic communication schedule generated by PCE 150.

As would be appreciated, various attempts are currently in progress to impose deterministic behavior on traffic flows, such as audio-video (AV) traffic. For example, IEEE 802.1 TSN attempts to impose deterministic behavior using a time-based trigger that causes the current sender to send the traffic. In sharp contrast to 802.1 TSN, the techniques herein propose a message/signaling-based trigger that causes the current sender to send the traffic, in various embodiments. Thus, node $N_{n-1}$ that is not synchronized in FIG. 5 will only send the traffic in response to receiving request 502 and with as little delay as possible. Said differently, the techniques herein introduce a pull mechanism that allows the sender to be oblivious to the network timing mechanism and the communication schedule for the deterministic flow. This pull mechanism is of particular interest of the originating node is in fact the source of the traffic (e.g., a normal PC, an IoT device, etc.) or a router at the edge of a deterministic network.

Various complementary techniques can also be employed to enhance the trigger mechanism disclosed herein. For example, as noted previously, the network devices may also use the preemption mechanism proposed in IEEE P802.1Qbu. Notably, P802.1Qbu introduces a mechanism that allows very time-sensitive packets to interrupt the normal best-effort packet being transmitted on an egress port and then resume sending once the time-sensitive packet has been transmitted. In some embodiments, the unsynchronized node (e.g., node $N_{n-1}$ shown, etc.) may use such a mechanism to prioritize the packet/traffic requested in request 502.

Another complementary technique is proposed in IEEE P802.1Qbv which defines a way for bridges and end stations to schedule the transmission of frames based on timing derived from IEEE standard 802.1AS. Such proposed mechanisms allow for the use of time-aware traffic shapers for scheduled traffic. This can be used with the techniques herein, for example, to allocate priority values for traffic and to enable credit-based traffic shaping for bridged traffic flows.

Figure 6:
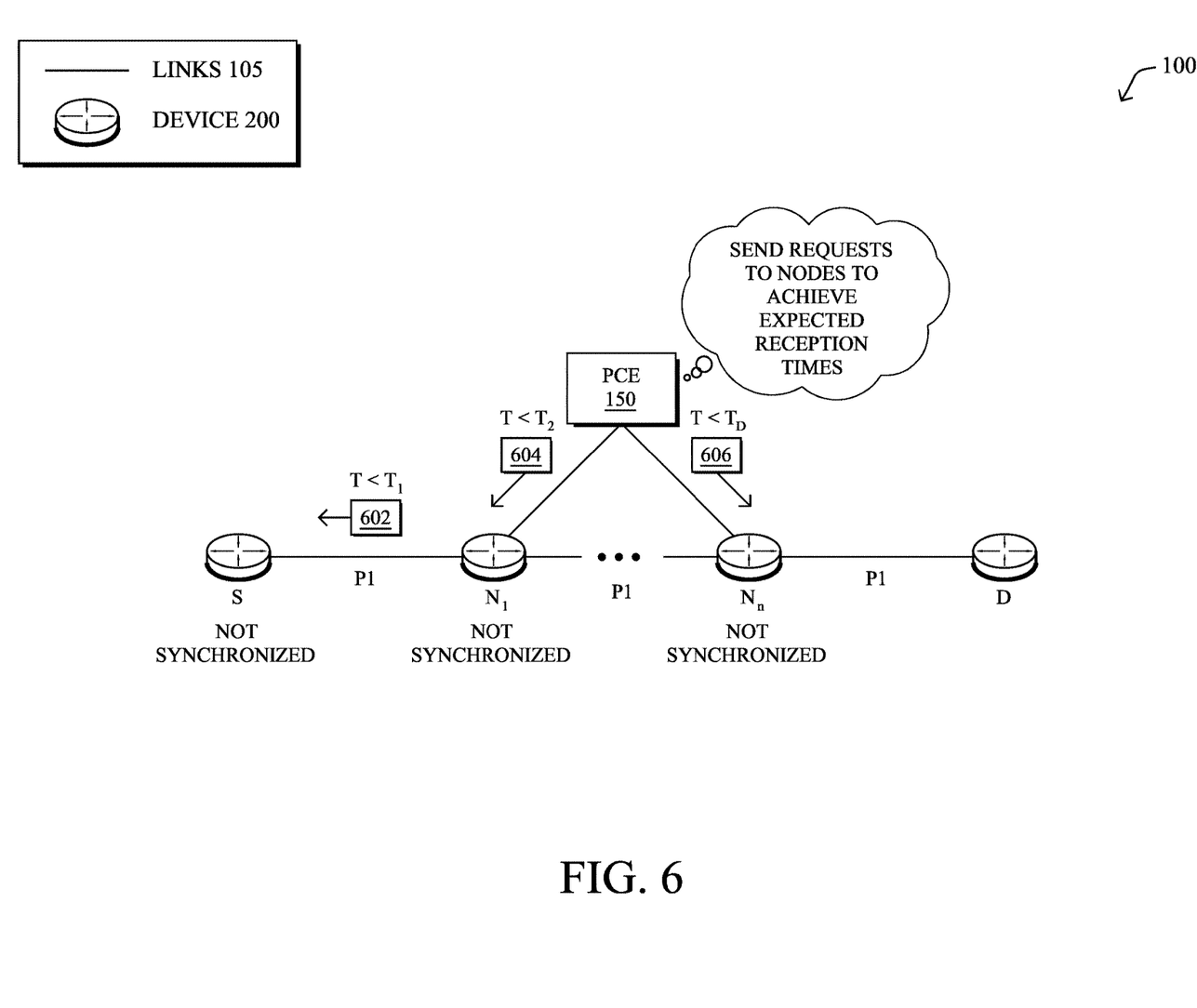
FIG. 6 illustrates an example of a traffic flow being sent deterministically via a network path that includes multiple unsynchronized nodes.

FIG. 6 illustrates yet another potential implementation, according to various embodiments. As shown, assume that some or all of the devices/nodes along path P1 do not support a time synchronization mechanism and do not have deterministic capabilities. In such cases, PCE 150 may instead send requests to these nodes at the appropriate times, to cause the nodes to send the requested communication on to the corresponding next hop along path P1. For example, PCE 150 may send request 602 to source node S at a time prior to the expected reception time for node $N_1$, allowing node $N_1$ to still receive the particular traffic flow communication at the expected time. Then, to ensure that the next hop (e.g., a node $N_2$) receives the communication by its expected reception time, PCE 150 may send a request 604 to node $N_1$ to request that the communication be sent. This process may continue any number of times until node $N_n$ receives request 606 from PCE 150 and finally sends the communication on to destination node D for reception at the expected time. While such a mechanism may work, it should be noted that the deterministic guarantees may be on the order of milliseconds to seconds, as opposed to nanoseconds in the other cases detailed above.

Figure 7:
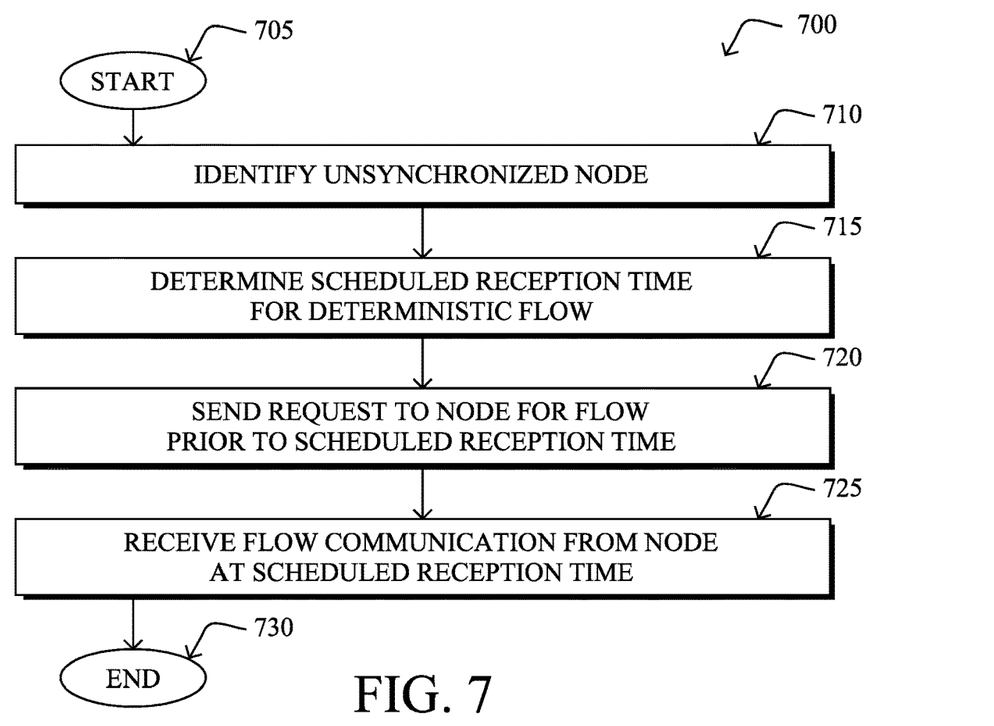
FIG. 7 illustrates an example simplified procedure for requesting that a particular deterministic traffic flow be sent.

FIG. 7 illustrates an example simplified procedure for requesting that a particular deterministic traffic flow be sent, in accordance with one or more embodiments described herein. The procedure 700 may start at step 705, and continues to step 710, where, as described in greater detail above, a device in a network may identify an unsynchronized node. Notably, the node may not be synchronized to a network time synchronization mechanism, meaning that its internal clock is not synchronized to that of the other nodes/devices in the network and cannot support deterministic scheduling. In some embodiments, the device may identify the node based on a configuration message received from a PCE that indicates that the device is to receive a particular communication/traffic flow from the node, but that the node itself is unsynchronized.

At step 715, as detailed above, the device may determine a scheduled reception time for a deterministic traffic flow from the identified node from step 710. In some embodiments, the device may receive a deterministic communication schedule from a supervisory device in the network, such as a PCE, that indicates the expected reception time of the particular flow from the node.

At step 720, the device may send a request to the node for the flow, prior to the scheduled reception time, as described in greater detail above. Such a request may include an identifier for the particular flow being requested and may cause the node to send the flow communication to the device in response. For example, the request may identify the destination of the flow and may include other identifiers, such as DSCP tags for the flow.

At step 725, as detailed above, the device may receive the requested traffic flow (e.g., a communication, such as a frame or packet) from the node. In various embodiments, the device may receive the flow at the expected reception time, thus allowing the device to forward the communication on to its next hop according to a deterministic communication schedule for the flow. Procedure 700 then ends at step 730.

Figure 8:
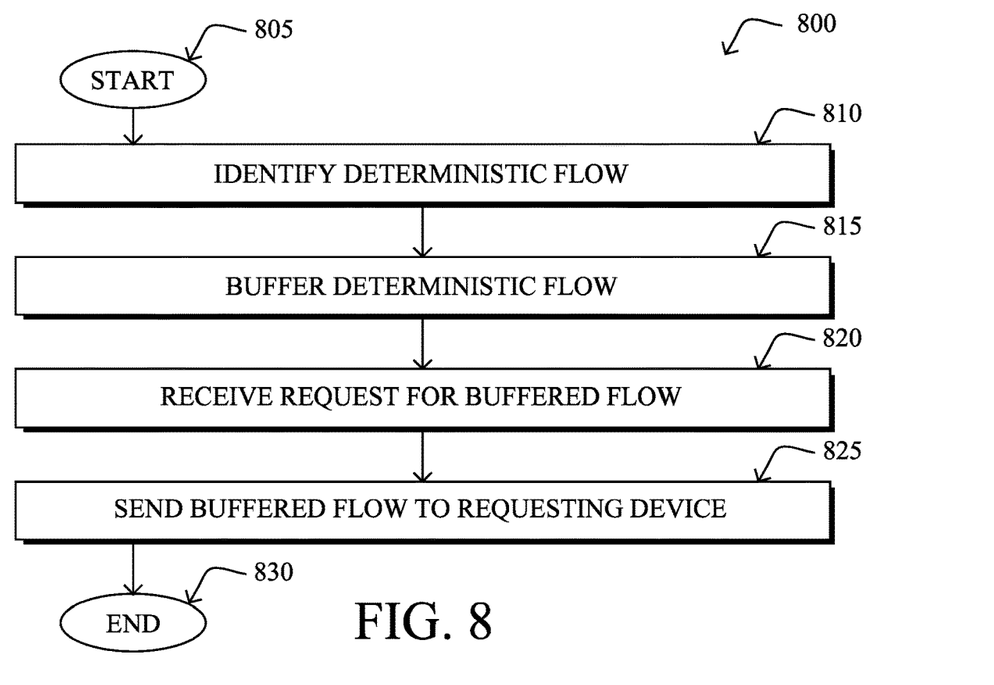
FIG. 8 illustrates an example simplified procedure for sending a particular requested deterministic traffic flow.

FIG. 8 illustrates an example simplified procedure for sending a particular requested deterministic traffic flow, according to various embodiments. The procedure 800 may start at step 805 and continues on to step 810 where, as described in greater detail above, a node in a network may identify a deterministic traffic flow/communication to be sent. For example, if the node is a sensor, the node may determine that a given sensor reading is to be communicated to a particular destination in the network.

At step 815, as detailed above, the node may buffer the deterministic traffic flow/communication for communication. Notably, the node may place the packet(s) of the flow in its communication buffer, upon identifying that the packet(s) are to be sent to the destination.

At step 820, the node may receive a request for the buffered traffic flow, as described in greater detail above. In various embodiments, the request may include an identifier for the particular traffic flow in the buffer of the node, thereby allowing the node to quickly identify the requested communication/packet(s) in its buffer. Such a request may be sent by the device to the node at such a time that the node is able to meet an expected reception time for the communication at the device.

At step 825, as detailed above, the node may send the requested traffic flow in its buffer to the requesting device. As noted, since the sending is triggered by the request received in step 820, the node is able to communicate the flow packet(s) to the device before or at the expected reception time for the device. This allows the device to meet a scheduled sending time for the communication (e.g., from the device to the next hop along the path), according to a deterministic communication schedule. Procedure 800 then ends at step 830.

It should be noted that while certain steps within procedures 700-800 may be optional as described above, the steps shown in FIGS. 7-8 are merely examples for illustration, and certain other steps may be included or excluded as desired. Further, while a particular order of the steps is shown, this ordering is merely illustrative, and any suitable arrangement of the steps may be utilized without departing from the scope of the embodiments herein. Moreover, while procedures 700-800 are described separately, certain steps from each procedure may be incorporated into each other procedure, and the procedures are not meant to be mutually exclusive.

The techniques described herein, therefore, allow for the formation of a deterministic communication path in a network, even in cases where one or more of the nodes/devices in the path do not have deterministic capabilities. For example, even if a given node/device is a simple switch, router, or end device that does not support a network time synchronization mechanism, the path can still be used to deliver communications in a deterministic manner.

While there have been shown and described illustrative embodiments that provide for deterministic communication in a network, it is to be understood that various other adaptations and modifications may be made within the spirit and scope of the embodiments herein.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method, comprising:
    receiving, at a device in a network, a communication schedule associated with a particular deterministic traffic flow from a path computation element (PCE) in the network;
    identifying, by the device, a node in the network as not synchronized with the communication schedule by determining that the node does not support a network synchronization mechanism;
    determining, by the device, a scheduled reception time for the particular deterministic traffic flow at which the device is to receive the traffic flow from the node;
    sending, by the device and prior to the scheduled reception time, a request to the node for the particular deterministic traffic flow, wherein the request identifies the particular deterministic traffic flow and causes the node to send the traffic flow to the device; and
    receiving, at the device and at the scheduled reception time, the particular deterministic traffic flow from the node.

2. The method as in claim 1, wherein the request sent to the node comprises a link layer message.

3. The method as in claim 1, wherein the device comprises an access switch in the network.

4. The method as in claim 1, wherein the node buffers the particular deterministic traffic flow for transmission prior to receiving the request for the traffic flow.

5. The method as in claim 1, wherein the network comprises a wired Ethernet network.

6. The method as in claim 1, further comprising:
    buffering, by the device, the received traffic flow for transmission;
    receiving, at the device, a request to send the traffic flow to a next-hop node in the network according to a path associated with the particular traffic flow; and
    sending, by the device, the buffered traffic flow to the next-hop node, in response to receiving the request to send the traffic flow to the next-hop node.

7. A method comprising:
    identifying, by a node that does not support a network synchronization mechanism in a network, a particular traffic flow as deterministic;
    buffering, by the node, the particular deterministic traffic flow for communication;
    receiving, at the node, a request to send the buffered traffic flow to a device in the network, wherein the request identifies the particular deterministic traffic flow and was sent, in response to an identification of the node as not synchronized with a communication schedule due to not supporting the network synchronization mechanism, prior to a scheduled reception time at which the device is to receive the traffic flow; and
    sending, by the node, the buffered traffic flow to the device, in response to receiving the request.

8. The method as in claim 7, wherein the request is received from the device.

9. The method as in claim 8, wherein the device is an access switch, and wherein the network is a wired Ethernet network.

10. The method as in claim 8, wherein the request is a link layer message.

11. The method as in claim 8, wherein the request identifies the particular deterministic traffic flow by indicating a destination address for the traffic flow and one or more Differentiated Services Code Point (DSCP) tags for the traffic flow.

12. The method as in claim 7, wherein the request is received from a path computation element (PCE) in the network.

13. An apparatus, comprising:
    one or more network interfaces to communicate with a network;
    a processor coupled to the network interfaces and configured to execute one or more processes; and
    a memory configured to store a process executable by the processor, the process when executed operable to:
        receive a communication schedule associated with a particular deterministic traffic flow from a path computation element (PCE) in the network;
        identify a node in the network as not synchronized with the communication schedule by determining that the node does not support a network synchronization mechanism;
        determine a scheduled reception time for the particular deterministic traffic flow at which the apparatus is to receive the traffic flow from the node;
        send, prior to the scheduled reception time, a request to the node for the particular deterministic traffic flow, wherein the request identifies the particular deterministic traffic flow and causes the node to send the traffic flow to the apparatus; and
        receive, at the scheduled reception time, the particular deterministic traffic flow from the node.

14. The apparatus as in claim 13, wherein the request sent to the node comprises a link layer message.

15. The apparatus as in claim 13, wherein the apparatus comprises an access switch in the network.

16. The apparatus as in claim 13, wherein the node buffers the particular deterministic traffic flow for transmission prior to receiving the request for the traffic flow.

17. The apparatus as in claim 13, wherein the network comprises a wired Ethernet network.

18. The apparatus as in claim 13, wherein the process when executed is further operable to:
    buffer the received traffic flow for transmission;
    receive a request to send the traffic flow to a next-hop node in the network according to a path associated with the particular traffic flow; and
    send the buffered traffic flow to the next-hop node, in response to receiving the request to send the traffic flow to the next-hop node.

* * * * *